US007509093B2

(12) United States Patent
Persson et al.

(10) Patent No.: US 7,509,093 B2
(45) Date of Patent: Mar. 24, 2009

(54) APPARATUS AND METHOD FOR INDICATING PROXIMITY CO-PRESENCE FOR SOCIAL APPLICATION USING SHORT RANGE RADIO COMMUNICATION

(75) Inventors: Per Persson, Helsinki (FI); Younghee Jung, Helsinki (FI)

(73) Assignee: Nokia Corporation, Espoo (FI)

( * ) Notice: Subject to any disclaimer, the term of this patent is extended or adjusted under 35 U.S.C. 154(b) by 783 days.

(21) Appl. No.: 10/961,469

(22) Filed: Oct. 7, 2004

(65) Prior Publication Data
US 2007/0232347 A1 Oct. 4, 2007

(51) Int. Cl.
*H04B 7/00* (2006.01)
(52) U.S. Cl. ............... 455/41.2; 455/414.1; 455/456.3; 455/518; 455/519; 370/328; 370/338
(58) Field of Classification Search ............... 455/41.2, 455/414.1, 456.3, 519, 41.1, 518; 370/328, 370/338
See application file for complete search history.

(56) References Cited

U.S. PATENT DOCUMENTS

| 2002/0183068 | A1* | 12/2002 | Dunko et al. ............... 455/456 |
| 2003/0037103 | A1 | 2/2003 | Salmi et al. |
| 2003/0065788 | A1 | 4/2003 | Salomaki |
| 2003/0229687 | A1* | 12/2003 | Ohno et al. ............... 709/220 |
| 2004/0014486 | A1 | 1/2004 | Carlton et al. |
| 2004/0116137 | A1* | 6/2004 | Bells et al. ............... 455/466 |
| 2004/0181517 | A1 | 9/2004 | Jung et al. |

FOREIGN PATENT DOCUMENTS

| DE | 101 49 496 | 4/2003 |
| EP | 1 473 684 | 11/2004 |
| WO | WO 03/017592 | 2/2003 |
| WO | WO 03/054574 | 7/2003 |

OTHER PUBLICATIONS http:home.core.com/web/start/instant messenger, CoreComm Communications, Inc., downloaded from Internet on Jan. 11, 2005; date of publication unknown.
U.S. Appl. No. 10/712,788, filed Nov. 12, 2003, Bart Delmulle et al.

* cited by examiner

*Primary Examiner*—Tuan A Pham
(74) *Attorney, Agent, or Firm*—Ware, Fressola, Van Der Sluys & Adolphson LLP

(57) ABSTRACT

A mobile device adapted to provide an indication of the proximate co-presence of a buddy—another user who has agreed to be indicated as nearby—using a short-range (local) transceiver to scan for a low-level identifier associated with a compatible short-range transceiver in a mobile device operated by the buddy. The mobile device provides an indication of proximate co-presence of another only in case of permission.

19 Claims, 3 Drawing Sheets

(Discovery)

(Monitoring)

APPARATUS AND METHOD FOR INDICATING PROXIMITY CO-PRESENCE FOR SOCIAL APPLICATION USING SHORT RANGE RADIO COMMUNICATION

TECHNICAL FIELD

The present invention pertains to the field of mobile wireless communication. More particularly, the present invention pertains to mobile wireless communication of data indicating whether a user of a mobile communication device is nearby another user of a mobile communication device.

BACKGROUND ART

Personal computer (PC) applications (such as Instant Messenger) that allow a user to check for availability of users on a list of other users—applications called here "presence-enabled applications"—have become a success in the PC world. These kinds of applications, provided by a service (such as e.g. AMERICA ONLINE® Internet service provider) allow a PC user to create a list of other users—typically acquaintances of the user—who are also registered with the same service, and to then be informed when any of the other users become accessible (because of logging onto the service) or are no longer so. Furthermore, users are able to create status messages explaining more in detail their availability, and they can also exchange messages, files and other data via their lists.

Most of existing presence-enabled applications rely on the Internet and its IP-based address system. This enables presence features to work independently of physical location and distances. Thus, acquainted users can communicate (digitally) and be aware of each other's (digital) activities independent of their physical location.

On the other hand, this independence of physical location on the part of Internet-based presence applications via a PC actually limits or makes impossible certain usage modes users might consider desirable. For instance, Internet-based presence-enabled applications via a PC cannot indicate when a user is physically close to a buddy, thus suggesting a face-to-face rendezvous.

In a few countries, Internet-based Instant Messenger services are offered via mobile terminals. However unlike use of PC-based Instant Messenger, use on a mobile terminal often involves additional cost due to a required Internet connection via a mobile phone network.

A mobile form of presence-enabled application is offered by Presence-enhanced Contacts (PEC, also known as 'Dynamic Contact Cards'), which imitates its PC-hosted internet-based counterpart by allowing a user to modify an availability indicator and to associate with it a text message (e.g. "Please call Mike. I am in a meeting.") and/or a graphical element such as an image, which can be immediately accessed by subscribers of the same service via a phone book entry of the user. In a future version of PEC, it may also allow location information to be automatically and continually added to the published presence information and so made available to the selected subscribers of a user. In this way, subscribers to a user's presence information can know beforehand whether a user is available to accept a call or other communication, and if so how the user would prefer to be contacted, and if not, what other options are available.

Although mobile presence could potentially notify a user when another user is nearby, the constant polling of information (passive sharing) becomes cumbersome to set up, and further, is seen as undesirable by some users, for privacy reasons. Past user studies have indicated strong user rejection of automatically publishing location information of a user, for various reasons, including the fact that such location information is centrally stored on a server, accessible by the company providing the service (e.g. the operator) and can be disseminated to other users in the cellular network. Therefore the desirability of mobile presence-enabled application for providing presence information automatically is dubious.

DISCLOSURE OF THE INVENTION

In a first aspect of the invention, a method is provided comprising: a step in which a first mobile device including a short-range radio transceiver uses the short-range radio transceiver to discover an identity expression of a user of a second mobile device and a corresponding low-level identifier; and a step in which the first mobile device uses the short-range radio transceiver to monitor for proximity co-presence of the second mobile device by polling for the second mobile device using the low-level identifier of the second mobile device.

In accord with the first aspect of the invention, the method may further comprise a step in which, in response to the second mobile device alerting the user as to the proximate co-presence of the first mobile device, the second mobile device establishes a voice connection with the first mobile device via a radio signal if the user of the second mobile device provides an input to the second mobile device that such a voice connection is to be established.

Also in accord with the first aspect of the invention, to discover the identity expression and the corresponding low-level identifier of the second mobile device, the first mobile device may broadcast a scanning signal via the short-range radio transceiver asking for the low-level identifier. Further, the method may be such that in broadcasting the scanning signal, either the scanning signal may also ask for the low-level identifier, or the first mobile device may ask for the identity expression after the second mobile device responds to the scanning signal.

Also in accord with the first aspect of the invention, prior to monitoring for proximity co-presence of the second mobile device, the second mobile device provides to the first mobile device permission to monitor for proximity co-presence of the second mobile device. Further, the second mobile device may display to the user of the second mobile device the identity expression of the user of the first mobile device for use by the user of the second mobile device in deciding whether to grant permission to be monitored.

Also in accord with the first aspect of the invention, the monitoring may be performed by the first mobile device polling the second mobile device using the low-level identifier for the second mobile device stored in the first mobile device.

In a second aspect of the invention, a computer program product is provided comprising a computer readable storage structure embodying computer program code thereon for execution by a computer processor, wherein said computer program code is hosted by a mobile device and comprises instructions for performing a method including: a step in which the mobile device uses a short-range radio transceiver to discover an identity expression of a user of another mobile device and a corresponding low-level identifier; and a step in which the mobile device uses the short-range radio transceiver to monitor for proximity co-presence of the other mobile device by polling for the other mobile device using the low-level identifier of the other mobile device.

In a third aspect of the invention, a mobile device is provided, comprising: means by which the mobile device uses a short-range radio transceiver included in the mobile device to discover an identity expression of a user of another mobile device and a corresponding low-level identifier; and means by which the mobile device uses the short-range radio transceiver to monitor for proximity co-presence of the other mobile device by polling for the other mobile device using the low-level identifier of the other mobile device.

In accord with the third aspect of the invention, the mobile device may further comprise: means for voice communication via a radio signal; and means for establishing a voice connection with a user of another mobile device via the radio signal based on information included with or associated with the identity expression of the user of the other mobile device. Further, the voice connection may be established via a radio access network of a cellular communication system.

In a fourth aspect of the invention, a system is provided, comprising: a plurality of mobile devices as in the third aspect of the invention in the case where the voice connection is established via a radio access network of a cellular communication system, and further comprising the radio access network and associated core network of the cellular communication system.

The invention thus addresses the above-described problems and concerns by putting a user's location at the core of the system and by relying on local/short-range radio technologies (e.g. Bluetooth)—which are mostly free of charge—and which naturally limits access to a user's published status dynamically, based on the user's current location. Only other users who are nearby a user would be able to access the presence information. The fact that such information is not centrally stored, and is only locally accessible on a client-to-client basis decreases privacy concerns associated with central presence servers.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

The invention provides proximity "co-presence" information of mobile devices based on the mobile devices being equipped with some form of local/short-range radio, such as Bluetooth Class 1 or 2, wireless LAN, or ultra-wide band. The invention is typically implemented as an application (one or more software modules) running on a mobile device (under an operating system also running on the mobile device), an application able to communicate with corresponding applications on other mobile devices via at least the short-range radio (and possibly also e.g. via cellular telephone functionality that may be included in the mobile device). Depending on the specific short-range radio technology used, the range of communication can vary. For example, the short-range radio technology could be boosted BlueTooth (BT), and so have a greater range than generic (ordinary, non-boosted) BT, typically hundreds of feet instead of the tens of feet usual for generic BT.

Figure 1:
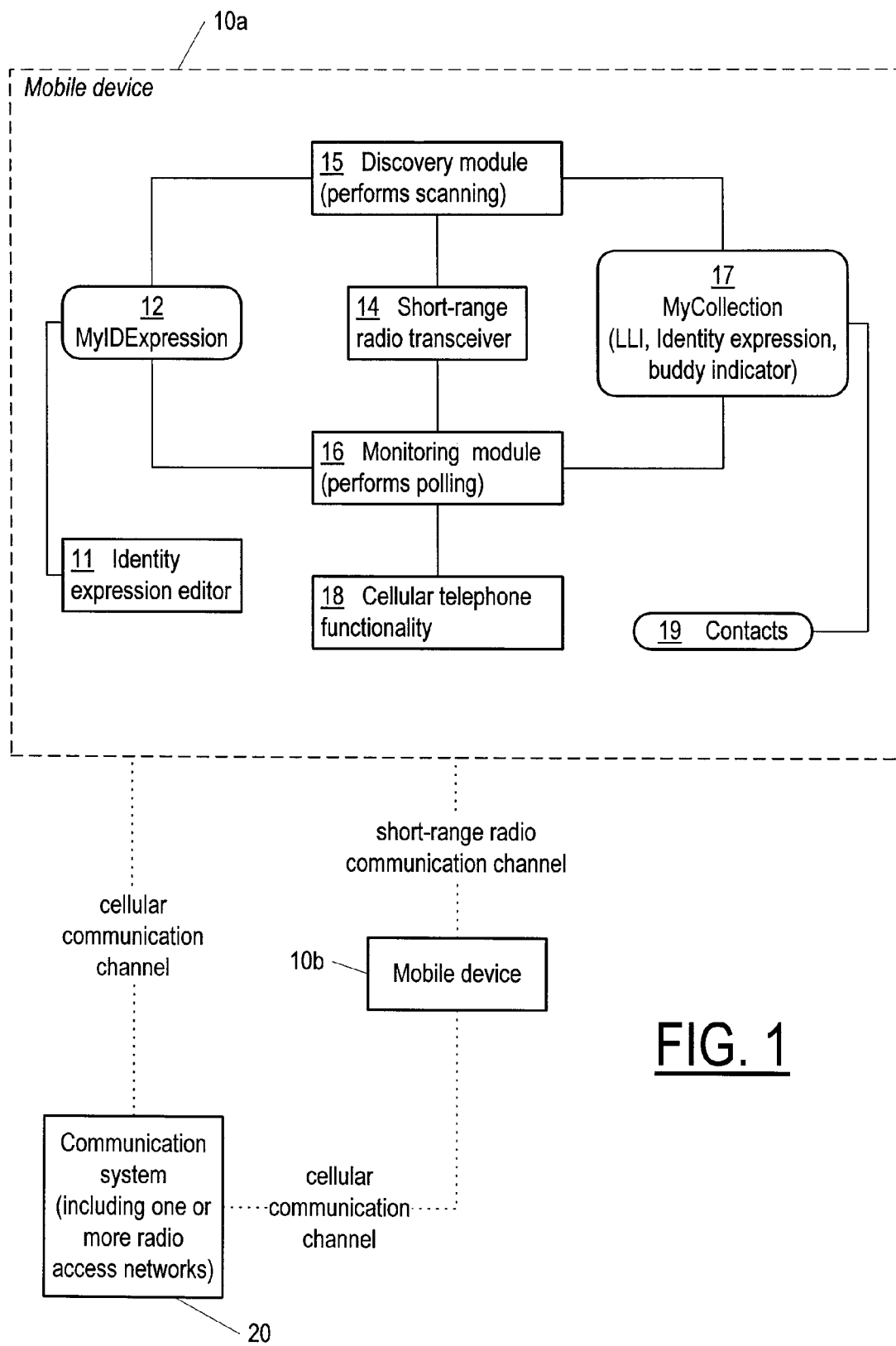
FIG. 1 is a block diagram of a system including mobile devices according to the invention.

Referring now to FIG. 1, a mobile device 10a according to the invention includes a short-range transceiver 14, which is used by a discovery module 15 and also a monitoring module 16 in providing proximity co-presence as described in more detail below. The short-range transceiver has stored in it a unique identifier, called here a low-level identifier (LLI), e.g. a BT MAC or a WLAN unique identifier/address. The mobile device 10a also typically includes an identity expression editor 11 (or at least some equivalent means) by which a user can create and store on the mobile device what is here called an identity expression, i.e. a file/page of information at least identifying the user by a name or at least having an association with a business card/personal information card in a contacts database and so indicating the user, and possibly also providing other information about the user (typically a picture), via text, imagery and sound. The identity expression created by the user of the mobile device is stored in what is here called a "MyIDExpression" data store 12. Also typically stored in the MyIDExpression data store is the LLI of the device. The LLI, as that term is used here, is a prior art LLI. For example, any BT transceiver has a permanent unique 48-bit device address assigned to the device; the permanent address is divided into a 24-bit LAP (Lower Address Part), a 16-bit NAP (Non-significant Address Part) and an 8-bit UAP (Upper Address Part). A first BT transceiver can scan for other BT transceivers, and if another BT transceiver is within range, it will respond with its LLI. Also, a first BT transceiver can "poll" a second BT transceiver using the LLI of the second BT transceiver, and so determine whether the second BT transceiver is nearby. The term "poll" as used here, and as explained in more detail below, indicates a communication directed to a particular LLI (serving as an address) after the user of the device having the LLI has agreed to be polled (i.e., as explained below, has agreed to be a "buddy").

Still referring to FIG. 1, the mobile device 10a perform two basic processes central to the invention: a discovery process performed by the discovery module 15; and a monitoring process performed by the monitoring module 16. In the discovery process, identity expressions of other mobile devices, also adapted to implement the invention, are discovered and stored in a data store 17 in the mobile device 10a, a data store called here the MyCollection data store. In performing the discovery process, the discovery module 15 performs what is here called scanning, in which the discovery module uses the short-range radio transceiver 14 to determine if other similarly adapted mobile devices are nearby. In effect, the scanning process amounts to the mobile device 10a sending a signal asking, "Can a mobile device equipped according to the invention hear this transmission?" (The scanning signal might also provide the LLI of the scanning mobile device 10a.) If another mobile device 10b is close enough to hear the scanning signal, it can acknowledge the scanning signal. There would then be further signaling between the scanning mobile device 10a and the other mobile device 10b, signaling in which the two devices exchange both LLIs and identity expressions. In a typical embodiment, following the exchange of the LLIs and identity expressions, each mobile device asks the respective user whether the user would like to become a buddy of the user of the other mobile device. For the user to make a decision, the user views the identity expression for the user of the other mobile device, and responds "yes" or "no" to being a buddy. Each discovery module then typically stores the LLI and identity expression and also the indication from the user of the other device as to whether the user wants to be considered a buddy. By agreeing to be considered a buddy, the user of the other mobile device gives permission to be monitored, as performed by the monitoring module 16 and as described next. The monitoring module 16 monitors only those users indicated in the MyCollection data store 17 as having agreed to be considered as a buddy.

Still referring to FIG. 1, the monitoring module 16 uses what is here called polling in performing the monitoring process. In polling a buddy (i.e. to determine if the buddy is nearby), the monitoring module 16 uses the LLI indicated in the MyCollection data store. In a typical embodiment, if the mobile device 10*a* determines that a buddy in the MyCollection data store 17 is nearby, the monitoring module alerts the user of the mobile device 10*a*, and offers to establish contact with the user via one or another communication channel, including for example a cellular telephone communication channel. Thus, for example, the monitoring module 16 may find in the MyCollection data store 17, in the record for the buddy whose proximity co-presence has been detected, a pointer to contact information in a contact data store 19, contact information with which the mobile device 10*a* can use cellular telephone functionality 18 to make a cell phone call via a communication system 20 to the user of the other mobile device 10*b*.

In the discovery process, in a typical embodiment, if the user declines to be indicated as a buddy in the MyCollection data store 17 of the other mobile device, the discovery module 15 still places a record in its MyCollection data store 17 indicating the LLI and identity expression of the declining user, but does not indicate in the record that the user of the other mobile device 10*b* has agreed to be treated as a buddy. Therefore, in future encounters with the other mobile device 10*b*, where the discovery module 15, via scanning, would again discover the LLI and identity expression of the other mobile device 10*b*, it will look in the MyCollection data store and find that the user of the other mobile device has already been asked but has declined to be indicated as a buddy, and so the discovery module 15 will not attempt to again discover the other mobile device 10*b*. Thus note then that the MyCollection data store 17 typically includes as a record the following set of fields: LLI, corresponding identity expression, and a flag indicating whether the user of the device having the LLI is to be treated as a buddy.

It is of course advantageous to allow for the possibility that after first having declined an offer to be indicated as a buddy, the user of the other mobile device 10B can reconsider. To enable this, the scanning process according to the invention can allow for a response to include a flag or other indication that a discovery module is to disregard any past discovery results for the other device 10*b*.

In the above description, scanning has been described as a process by which the mobile device 10*a* in effect asks if any other mobile device is nearby and is also adapted to implement the invention. Another so-adapted mobile device within range of the scanning mobile device responds with its LLI and identity expression, as explained above. It is also possible, however, for the scanning process to be implemented as one in which the mobile device 10*a* simply listens to hear whether some other mobile device, equipped according to the invention, announces its presence in one or another broadcast mode of operation, providing both its LLI and identity expression.

Besides a mobile device obtaining an identity expression for a user of another mobile device via the discovery process described above, the owner of the identity expression owner can send the identity expression over MMS/email to the mobile device, which will then automatically add it to the proximity presence database—the MyCollection data store.

In a typical embodiment, there is no need to register with a central server in order to use the invention. This is an important difference compared to a PC-hosted Internet-based presence application. As explained above, when a user's identify expression is stored in the MyCollection data store of a mobile device (because it has been discovered by the mobile device or because it was sent to the mobile device by the user), the LLI is stored in the mobile device with the identity expression (i.e. in the MyCollection data store). This list of identity expressions in a MyCollection data store with corresponding LLIs is equivalent to the so-called 'Buddy list' used by Instant Messenger applications, but as mentioned, instead of a server-registered identifier as in the case of Instant Messenger applications, each identity expression is stored with the corresponding LLI for the short-range transceiver included as part of a mobile device according to the invention.

Since the system uses a local radio technology, users can rest assured that all usage of the proximity co-presence capability provided by the invention is free of charge, and further, that access to the published identity expression of a user is limited to other users who are located within the range of the local radio.

In some embodiments, if a user listed in the MyCollection data store of another user has changed the user's identity expression after it was first stored in the MyCollection data store (changed only in ways that allow the identity expression to be equated automatically to a stored identity expression), the changed identity expression is automatically downloaded into the MyCollection data store in replacement of the earlier version the first time the user comes into range of the other user after the identity expression of the other user is changed. This is done e.g. during scanning, where the discovery module receives a response indicating an LLI and corresponding identity expression and, by referring to the MyCollection data store, notes that the identity expression has been changed. Alternatively, when polling another mobile device, the polling mobile device can receive from the polled device a response including a new identity expression.

Besides providing proximity co-presence advisories, a user of a mobile device adapted to implement the invention can use the LLI for another mobile device as a shortcut for initiating communication with the other mobile device. For instance, a user A can send a private proximity message to a user B listed in the MyCollection data store of user A, i.e. the message can be sent via the local radio so as to be addressed to user B, not broadcast. The message can include text, images and other forms of multimedia elements supported by the phone. With the proximity co-presence provided by the invention, the user A is already aware whether the other user B is proximally co-present (i.e. in range of the local radio). If user B cannot be found (by scanning) but is already linked to an entry in a Contacts data store of user A, then user A can make an informed decision (informed in that user A knows that user B is probably not nearby) as to whether or not to use some other means of communicating with user B, such as SMS, MMS, e-mail or cellular or other wireless telephony (depending on what is shown as a possible means of communication in the Contacts data store).

Figure 2:
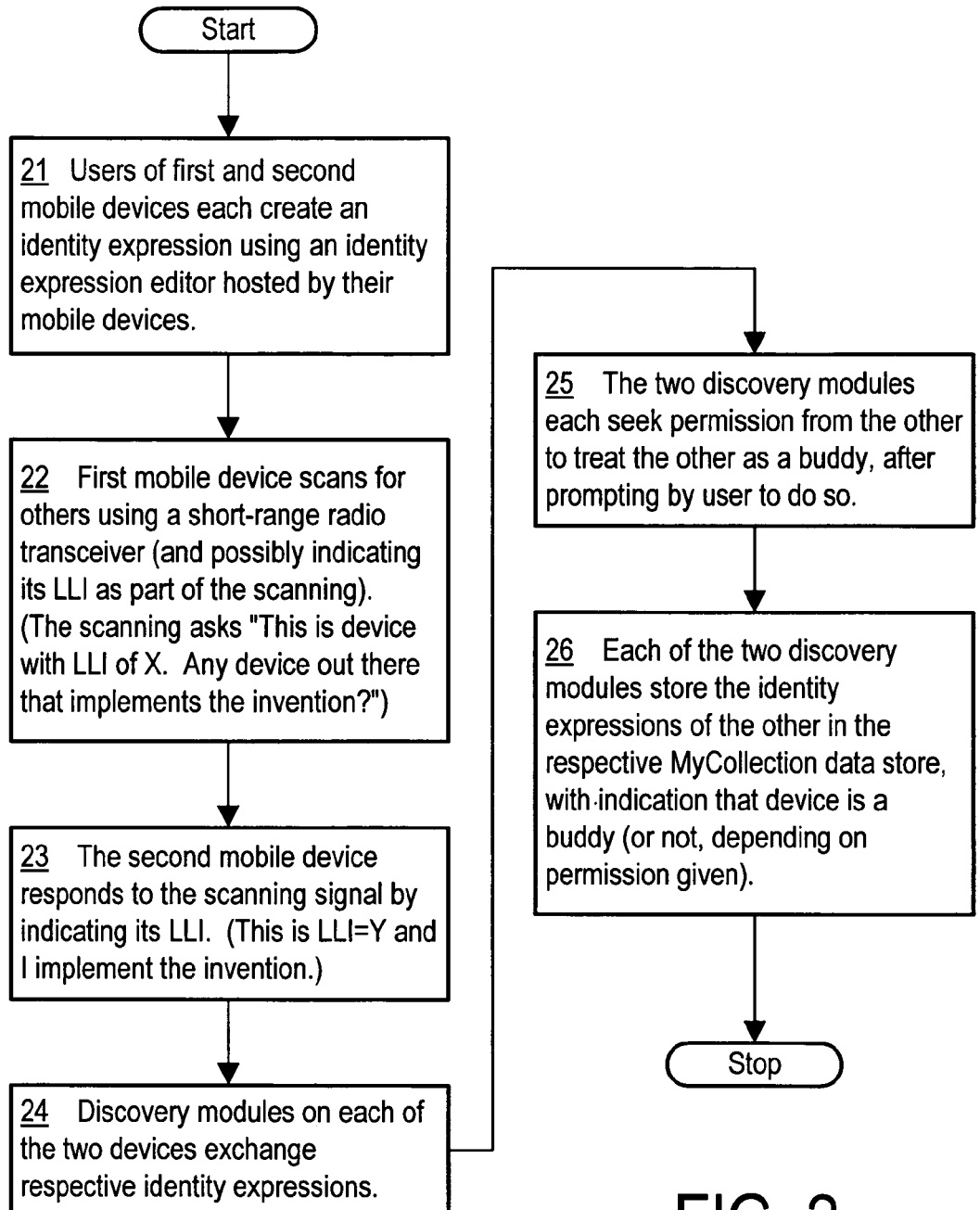
FIG. 2 is a flow diagram of a scenario illustrating the discovery process of the invention.

Referring now to FIG. 2 and also to FIG. 1, the discovery process is illustrated as including a first step 21 in which a user of the mobile device 10*a* creates an identity expression using the identity expression editor 12. A user of a second mobile device 10*b* also creates an identity expression using a respective identity expression editor. In a second step 22, the first mobile device 10*a* scans for other mobile devices adapted according to the invention. The scanning process, as explained above, is in effect a transmission asking, "Is there any device out there that implements the invention?" The scanning transmission also possibly indicates the LLI of the scanning mobile device.

In a next step 23, the second mobile device 10b responds to the scanning signal by indicating its LLI, and so in effect indicating that it implements the invention and is to be addressed using the LLI it provides. In a next step 24, the discovery module 15 of the first mobile device 10a exchanges identity expressions with a corresponding discovery module in the second mobile device 10b, and the first mobile device 10a provides its LLI if it did not provide its LLI in the scanning signal. In a next step 25, the discovery module 15 of the first mobile device 10a and the respective discovery module in the second mobile device 10b each seek permission from the other to treat the other as a buddy, i.e. each seek permission from the other to monitor for the proximity co-presence of the other. The seeking of permission by a mobile device for another mobile device is typically done only if the user of the mobile device indicates such permission should be sought from the other mobile device, after prompting by the discovery module hosted by the user's mobile device. In such prompting, the user's mobile device typically displays to the user the identity expression of the user of the other mobile device for use by the user in deciding whether the user wants to be treated as a buddy by the other mobile device.

In a next step 26, the discovery module 15 of the mobile device 10a stores the identity expression and corresponding LLI of the other device 10b in the MyCollection data store. 17, typically with an indication that the mobile device 10b is a buddy, if permission for treating the mobile device 10B as a buddy is obtained, but if not, typically indicating that the mobile device is not to be treated as a buddy, i.e. is not to be polled. The discovery module in the other mobile device 10b takes a corresponding action. (In some embodiments, the identity expression and LLI are stored only if the corresponding user has granted permission to be monitored.)

Figure 3:
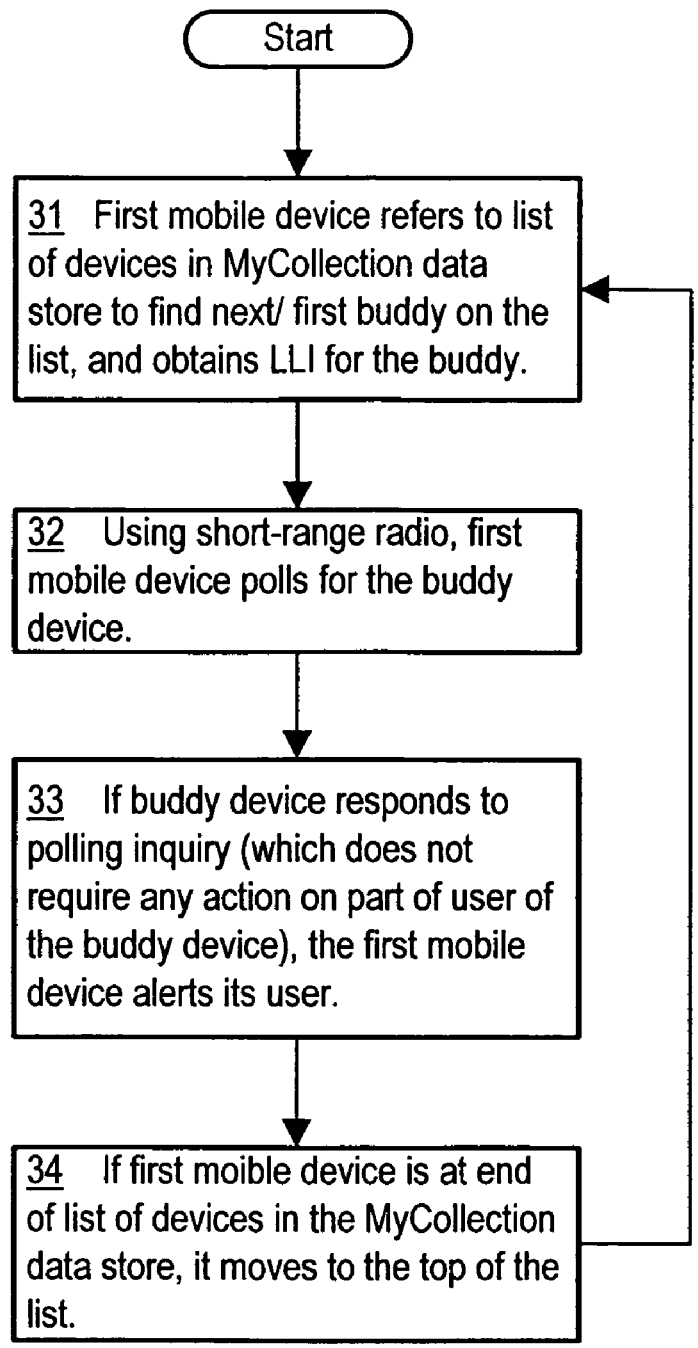
FIG. 3 is a flow diagram illustrating the monitoring process of the invention.

Referring now to FIG. 3 and also to FIG. 1, the monitoring process is illustrated as including a first step 31 in which the mobile device 10a refers to the list of devices in the MyCollection data store 17 in order to find the first or next buddy on the list, and so obtains the LLI for the buddy. In a next step 32, using the short-range radio transceiver 14, the mobile device 10a polls for the buddy device, i.e. transmits a signal indicating the LLI of the buddy device, and so in effect asks, "Are you nearby buddy device (using the LLI of the buddy device to identify the buddy device)?" In a next step 33, if the buddy device responds to the polling inquiry, and so in effect reveals its proximity co-presence, the first mobile device 10a alerts the user. It is assumed here that the user of the buddy device has previously given permission to be polled, and in such a situation for the buddy device to respond to the polling inquiry no action is required on the part of the user of the buddy device. Thus, the user of the buddy device may not even be informed that the buddy device is responding to the polling device. In a typical embodiment, though, the buddy device would notify its user that the polling device is nearby. It is of course possible that the buddy relationship is asymmetrical, i.e. one of two users might agree to be polled by the other, but not conversely.

In a next step 34, if the first mobile device is at the end of the list of devices in the MyCollection data store 17, it moves to the top of the list so that the polling process is ongoing and directed to each buddy in turn in the list of buddy devices in the MyCollection data store.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
a first mobile device using a short-range radio transceiver included in the first mobile device to discover an identity expression of a user of a second mobile device, a corresponding low-level identifier permanently assigned to the second mobile device, and a flag indicating if the user of the second mobile device grants permission to be monitored, and storing the low-level identifier, identity expression and flag for later use; and
the first mobile device using the short-range radio transceiver to monitor for proximity co-presence of the second mobile device by polling for the second mobile device using the stored low-level identifier of the second mobile device but only if the stored flag indicates that the user of the second mobile device has granted permission to be monitored.

2. A method as in claim 1, further comprising the first mobile device providing a signal to a user of the first mobile device alerting the user as to the proximate co-presence of the second mobile device, and establishing a voice connection with the second mobile device via a radio signal if the first mobile device receives an input from the user of the first mobile device that such a voice connection is to be established.

3. A method as in claim 1, wherein to discover the identity expression and the corresponding low-level identifier of the second mobile device, the first mobile device broadcasts a scanning signal via the short-range radio transceiver asking for the low-level identifier.

4. A method as in claim 3, wherein either the scanning signal also asks for the low-level identifier, or the first mobile device asks for the identity expression after the second mobile device responds to the scanning signal.

5. A method as in claim 1, further comprising the first mobile device providing to the second mobile device an identity expression of a user of a first mobile device, a corresponding low-level identifier permanently assigned to the first mobile device, and a flag indicating if the user of first mobile device grants permission to be monitored, wherein the first mobile device displays to the user of the first mobile device the identity expression of the user of the second mobile device for use by the user of the first mobile device in deciding whether to grant permission to be monitored.

6. A mobile device, comprising:
one or more modules configured for using a short-range radio transceiver included in the mobile device to discover an identity expression of a user of another mobile device, a corresponding low-level identifier permanently assigned to the other mobile device, and a flag indicating if the user of the other mobile device is willing to be monitored, and storing the low-level identifier, identity expression and flag for later use; and
one or more modules configured for using the short-range radio transceiver to monitor for proximity co-presence of the other mobile device by polling for the other mobile device using the low-level identifier of the other mobile device but only if the stored flag indicates that the user of the other mobile device has granted permission to be monitored.

7. A mobile device as in claim 6, further comprising:
one or more modules configured for voice communication via a radio signal; and one or more modules configured for establishing a voice connection with a user of another mobile device via the radio signal based on information included with or associated with the identity expression of the user of the other mobile device.

8. A mobile device as in claim 7, wherein the mobile device is configured so that the voice connection is established via a radio access network of a cellular communication system.

9. A mobile device as in claim 6, wherein the mobile device includes one or more modules configured for broadcasting a scanning signal via the short-range radio transceiver asking for the low-level identifier.

10. A mobile device as in claim 9, wherein either the scanning signal also asks for the low-level identifier, or the mobile device also includes means for asking for the identity expression after the other mobile device responds to the scanning signal.

11. A mobile device as in claim 6, wherein the mobile device includes one or more modules configured for checking that the mobile device has received permission from the other mobile device to monitor for proximity co-presence of the other mobile device.

12. A mobile device as in claim 11, wherein the mobile device includes one or more modules configured for displaying to a user of the mobile device the identity expression of the user of the other mobile device.

13. A mobile device as in claim 6, wherein in order to monitor for the proximity co-presence of the other mobile device, the mobile device includes means for polling the other mobile device using the low-level identifier for the other mobile device stored in the mobile device, and means for determining whether permission for polling the other mobile device is also stored in the mobile device.

14. A system, comprising: a plurality of mobile devices as in claim 8, and further comprising the radio access network and associated core network of the cellular communication system.

15. A mobile device, comprising:

a discovery module configured for using a short-range radio transceiver included in the mobile device to discover an identity expression of a user of another mobile device, a corresponding low-level identifier permanently assigned to the other mobile device, and a flag indicating if the user of the other mobile device grants permission to be monitored, and storing the low-level identifier, identity expression and flag for later use; and a monitoring module configured for using the short-range radio transceiver to monitor for proximity co-presence of the other mobile device by polling for the other mobile device using the low-level identifier of the other mobile device but only if the stored flag indicates that the user of the other mobile device has granted permission to be monitored.

16. A mobile device as in claim 15, further comprising:

a cellular telephone functionality module configured for voice communication via a radio signal, and for establishing a voice connection with a user of the other mobile device via the radio signal based on information included with or associated with the identity expression of the user of the other mobile device.

17. A mobile device as in claim 16, wherein the mobile device is configured so that the voice connection is established via a radio access network of a cellular communication system.

18. Apparatus comprising:

means for discovering with a first mobile device using a short-range radio transceiver an identity expression of a user of a second mobile device, a corresponding low-level identifier permanently assigned to the second mobile device, and a flag indicating if the user of the second mobile device grants permission to be monitored, and storing the low-level identifier, identity expression and flag for later use; and means for monitoring with the first mobile device using the short-range radio transceiver a proximity co-presence of the second mobile device by polling for the second mobile device using the stored low-level identifier of the second mobile device but only if the stored flag indicates that the user of the second mobile device has granted permission to be monitored.

19. A method as in claim 18, further comprising the first mobile device providing to the second mobile device an identity expression of a user of a first mobile device, a corresponding low-level identifier permanently assigned to the first mobile device, and a flag indicating if the user of first mobile device grants permission to be monitored, wherein the first mobile device displays to the user of the first mobile device the identity expression of the user of the second mobile device for use by the user of the first mobile device in deciding whether to grant permission to be monitored.

* * * * *